(12) United States Patent
Borden et al.

(10) Patent No.: US 12,738,158 B1
(45) Date of Patent: Sep. 15, 2026

(54) WIRELESS TRAFFIC SIGNAL SYSTEM

(71) Applicants: Jeremy Borden, Mobile, AL (US); Benjamin Nichols, Mobile, AL (US)

(72) Inventors: Jeremy Borden, Mobile, AL (US); Benjamin Nichols, Mobile, AL (US)

( * ) Notice: Subject to any disclaimer, the term of this patent is extended or adjusted under 35 U.S.C. 154(b) by 5 days.

(21) Appl. No.: 18/732,590

(22) Filed: Jun. 3, 2024

Related U.S. Application Data

(60) Provisional application No. 63/470,731, filed on Jun. 2, 2023.

(51) Int. Cl.

| | |
|---|---|
| ***G08G 1/07*** | (2006.01) |
| ***G08G 1/095*** | (2006.01) |
| ***H04W 4/30*** | (2018.01) |
| ***H05B 45/30*** | (2020.01) |

(52) U.S. Cl.
CPC ............... *G08G 1/07* (2013.01); *G08G 1/095* (2013.01); *H04W 4/30* (2018.02); *H05B 45/30* (2020.01)

(58) Field of Classification Search
CPC ........... G08G 1/07; G08G 1/095; H04W 4/30; H05B 45/30
See application file for complete search history.

(56) References Cited

U.S. PATENT DOCUMENTS

| | | | |
|---|---|---|---|
| 5,010,336 A * | 4/1991 | Mosele | H05B 41/34 340/908 |
| 5,136,287 A | 8/1992 | Borenstein | |
| 5,457,450 A | 10/1995 | Deese et al. | |
| 5,663,719 A | 9/1997 | Deese et al. | |
| 5,833,355 A | 11/1998 | You | |
| 5,898,381 A | 4/1999 | Gartner | |
| 5,898,389 A | 4/1999 | Deese et al. | |
| 6,036,336 A | 3/2000 | Wu | |
| 6,054,932 A | 4/2000 | Gartner et al. | |
| 6,072,407 A | 6/2000 | Shin | |
| 6,087,962 A | 7/2000 | Rojas | |
| 6,147,623 A | 11/2000 | Rippen | |
| 6,150,771 A | 11/2000 | Perry | |
| 6,268,801 B1 | 7/2001 | Wu | |
| 6,283,613 B1 | 9/2001 | Schaffer | |
| 6,392,563 B1 | 5/2002 | Paquette et al. | |
| 6,502,956 B1 | 1/2003 | Wu | |

(Continued)

FOREIGN PATENT DOCUMENTS

| | | |
|---|---|---|
| AU | 200071438 B3 | 9/2001 |
| AU | 2021102655 A4 | 7/2021 |

(Continued)

*Primary Examiner* — Sisay Yacob
(74) *Attorney, Agent, or Firm* — AdamsIP, LLC; Stephen Thompson; J. Hunter Adams

(57) ABSTRACT

A wireless traffic signal system that is generally for temporary use is provided. The system may include a frame onto which multiple individual LED light modules may be installed as a single unit that includes a wireless communications module. The unit is designed to be installed as a single unit directly onto an existing traffic light head so that existing infrastructure already located in an appropriate position relative to traffic may be utilized for installation of a temporary system. The system includes a cabinet interface device that communicates with the wireless communications module and interfaces between the LED light modules and an existing signal controller.

17 Claims, 14 Drawing Sheets

(56) References Cited

U.S. PATENT DOCUMENTS 6,509,840 B2 1/2003 Martineau
6,522,263 B2 2/2003 Jones
6,567,010 B1 5/2003 Lin et al.
6,597,179 B2 7/2003 St.-Germain
6,762,689 B2 7/2004 Dechape
6,796,698 B2 9/2004 Sommers et al.
6,809,655 B1 10/2004 Colby
6,847,306 B2 1/2005 Diba et al.
6,850,169 B2 2/2005 Manavi et al.
6,905,227 B2 6/2005 Wu
6,911,915 B2 6/2005 Wu et al.
6,955,449 B2 10/2005 Marineau
6,987,464 B2 1/2006 Pearson
7,006,011 B1 2/2006 Colby
7,057,529 B2 6/2006 Bourgault
7,101,059 B2 9/2006 Blumel
7,102,538 B2 9/2006 Chen
7,167,106 B2 1/2007 Haase
7,175,305 B2 2/2007 Martineau
7,237,924 B2 7/2007 Martineau et al.
7,274,302 B2 9/2007 Stevenson et al.
7,281,819 B2 10/2007 Hsieh et al.
7,307,546 B1 12/2007 Partap
7,333,027 B2 2/2008 Bourgault
7,390,107 B2 6/2008 Blumel
7,423,551 B1 9/2008 Sharrow
7,425,798 B2 9/2008 St.-Germain
7,434,968 B2 10/2008 Wu
7,490,954 B2 2/2009 Mayer
7,538,689 B2 5/2009 Haase
7,553,044 B2 6/2009 Wedell
7,586,421 B2 9/2009 Witte et al.
7,671,760 B2 3/2010 Vallejo, Sr.
7,674,026 B2 3/2010 Uchida et al.
7,695,158 B2 4/2010 Kawabe
7,696,698 B2 4/2010 Ghanem
7,701,150 B2 4/2010 Nguyen et al.
7,764,195 B2 7/2010 Glover
7,771,087 B2 8/2010 Wilcox et al.
7,808,402 B1 10/2010 Colby
7,859,430 B2 12/2010 Ochiai
7,883,226 B2 2/2011 Li
7,911,357 B2 3/2011 Isac
8,089,374 B2 1/2012 Mayer et al.
8,248,271 B2 8/2012 Ghanem et al.
8,310,404 B2 11/2012 Kishimoto et al.
8,319,662 B1 11/2012 Bontemps et al.
8,675,909 B2 3/2014 Sivertsen
8,773,023 B2 7/2014 Ghanem et al.
8,797,183 B2 8/2014 Burton et al.
9,068,704 B2 6/2015 Burton et al.
9,142,126 B2 9/2015 Scoda
9,161,421 B2 10/2015 Mohammediyan et al.
9,291,329 B2 3/2016 Dubuc
9,518,721 B1 12/2016 Cohen
9,524,641 B2 12/2016 Nguyen et al.
9,564,049 B2 2/2017 Diba
9,570,940 B2 2/2017 Hysell et al.
9,709,243 B2 7/2017 Wu et al.
9,875,653 B2 1/2018 Diba
10,082,252 B2 9/2018 Tavernese et al.
10,551,041 B2 2/2020 Lozeau et al.
10,619,829 B2 4/2020 Dubuc et al.
10,672,268 B1 6/2020 Weader
10,720,052 B2 7/2020 Hung
10,791,606 B2 9/2020 Hung
10,879,729 B2 12/2020 Hysell et al.
11,510,298 B1 11/2022 Sterling
2001/0054970 A1* 12/2001 Jones .................. G08G 1/0955 340/471
2002/0027510 A1 3/2002 Jones et al.
2004/0008127 A1* 1/2004 Manavi .................. G08G 1/096 340/906
2004/0070518 A1 4/2004 Whittle, Jr. et al.
2005/0063182 A1 3/2005 Birch et al.
2005/0094407 A1 5/2005 Heald et al.
2006/0092044 A1 5/2006 Naljotov
2006/0197684 A1 9/2006 Tremblay
2007/0268149 A1 11/2007 Chen
2008/0100471 A1 5/2008 Chang et al.
2008/0122364 A1 5/2008 McClellan
2008/0123340 A1 5/2008 McClellan
2008/0129542 A1 6/2008 Chen
2008/0136671 A1 6/2008 Shen
2008/0136672 A1 6/2008 Shen
2008/0150758 A1* 6/2008 Vallejo, Sr. ............ G08G 1/095 340/907
2008/0258933 A1 10/2008 Diba
2008/0266136 A1 10/2008 Diba
2008/0315776 A1 12/2008 Openiano
2009/0058680 A1 3/2009 Benn
2009/0267794 A1 10/2009 Chang et al.
2010/0182164 A1 7/2010 Diba
2010/0225502 A1 9/2010 Elsheemy
2010/0315264 A1 12/2010 Tarolli
2011/0006915 A1 1/2011 Sower
2011/0134636 A1 6/2011 Chang et al.
2011/0228533 A1 9/2011 Lim
2016/0244922 A1* 8/2016 Townsend, Jr. ........ G08G 1/095
2016/0247401 A1* 8/2016 Nguyen ................. G08G 1/097
2022/0208001 A1 6/2022 Kijashka

FOREIGN PATENT DOCUMENTS

EP 1286321 A1 2/2003
WO 9838615 A2 9/1998
WO 2004109620 A1 12/2004
WO 2007077184 A1 7/2007

* cited by examiner 12
14
18
Cabinet Interface Device
20
80
10

WIRELESS TRAFFIC SIGNAL SYSTEM

CROSS REFERENCES

This application claims the benefit of U.S. Provisional Application No. 63/470,731, filed Jun. 2, 2023, which application is incorporated herein in its entirety by reference.

FIELD OF THE INVENTION

The present disclosure relates generally to a wireless traffic signal system designed for use with existing traffic signal systems or as a standalone traffic signal system.

BACKGROUND

Traffic lights are installed at thousands of intersections throughout the country to facilitate efficient traffic control. However, traffic lights frequently need to be temporarily taken out of service for a variety of reasons, such as equipment repairs or upgrades, road construction or other infrastructure work, or emergency situations, such as accidents or other unexpected power interruptions. In some cases, power to the system may be entirely interrupted or the existing system may need to be placed in a flashing state. During these types of events, traffic cannot be controlled in a normal manner, thus presenting safety concerns for vehicles as well as pedestrians and cyclists at intersections. Additionally, when designing a new signal, there may be a lack of utility power, underground utilities may conflict, or other types of constraints may exist that make a conventional wired signal difficult to install.

In emergency cases, portable systems may be used on a temporary basis until the existing system can be put back into service. Such portable systems are often trailer-mounted systems that are set up around an intersection for traffic control. Trailer-mounted systems generally require a large area to set up and deploy. However, sufficient space for trailer-mounted systems is not always available, and such systems do not always allow for all of the desired traffic movements for a particular intersection. Further, temporary traffic signals are often difficult to deploy in multiple directions to effectively work in concert. Typically, each phase and all associated signal modules are separately programmed and could potentially change states in conflicting configurations. In addition, deploying temporary traffic signals when an intersection is already in a flashing state or running in full operation may be difficult to implement and potentially dangerous, requiring the existing system to be flagged or turned off, which may create an unsafe environment for motorists.

In other cases, such as in road construction work, existing traffic signal systems that are in an active multi-phased work zone require relocating the signal heads multiple times to keep them in appropriate positions over or adjacent to roadways. Relocation of existing traffic heads may be difficult or impossible due to lack of slack in existing connection cables. In addition, relocation of traffic heads may sometimes require temporarily suspending cables from one span pole assembly to a completely different span pole assembly, which may require the use of jumper cables, terminal boxes, installation of entirely new conductor cables across the board, or other similar types of installations. Thus, traffic head relocations are generally a time consuming and costly process, which may lead to non-ideal traffic situations where safety can be compromised.

SUMMARY

In one aspect, a wireless traffic signal system and a method of using the system to control traffic signals are provided. The system is designed to be used with existing traffic light heads, traffic controllers, and malfunction management units (MMU) so that the system can be installed at an existing location already utilizing traffic signals for traffic control with minimal disruption to traffic flow. The system is generally designed for temporary use while the existing system is out of service or during repairs, upgrades, or other work such as road construction work, though in some embodiments the system may be utilized as a permanent or semi-permanent installation.

The system comprises one or more light modules that are configured to be removably secured to an existing traffic light head. The one or more light modules preferably includes three modules including standard red, green, and yellow lights, respectively, for traffic control, though the number of modules utilized may vary and other colors may also be programmed. Each light module comprises a housing that can support a battery and an LED light board or other type of light suitable for traffic control. The system further comprises a wireless communications module that is in communication with each of the light modules and a cabinet interface device that is configured to communicate wirelessly with the wireless communications module. The cabinet interface device may programmably interface with an existing traffic signal cabinet used for controlling the light signals of the existing traffic light head and is configured to wirelessly control the light signals emitted by the LED light boards of each of the light modules once the system is installed.

In a preferred embodiment in which the system is used for temporary use, the system further comprises a frame onto which each of the light modules is mounted to form a single unit that may then be installed onto an existing traffic light head, which preferably comprises one or more visors used to direct the signal indication of one or more existing lights already installed on the traffic light head in an appropriate direction toward approaching traffic and to reduce sun phantom. The frame with mounted light modules is configured to slide onto the existing traffic light head with each of the light modules being positioned within a respective one of the visors so that the frame and the light modules mounted thereon are supported by the existing traffic light head. The light modules may each fit within one of the visors with the existing light previously installed on the existing head being positioned behind the light module of the present system. The frame and light modules as a unit is supported and held in place by the existing light head and visors, though an additional fastening mechanism may be utilized for safety purposes to ensure that the frame and attached light modules are securely retained on the existing light head during the time of use.

In an alternative embodiment, each of the light modules may be individually configured to be removably secured to a respective one of the visors of the existing traffic light head so that a frame onto which all of the modules are mounted is not required.

In another alternative embodiment, each of the light modules may be mounted individually onto a permanent assembly such as a traditional traffic light head assembly and used as a permanent installation without the need for an existing traffic light head with visors.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DESCRIPTION OF THE DRAWINGS

These and other features, aspects, and advantages of the present invention will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, ingredients, steps, etc. are optionally present. For example, an article "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 4:
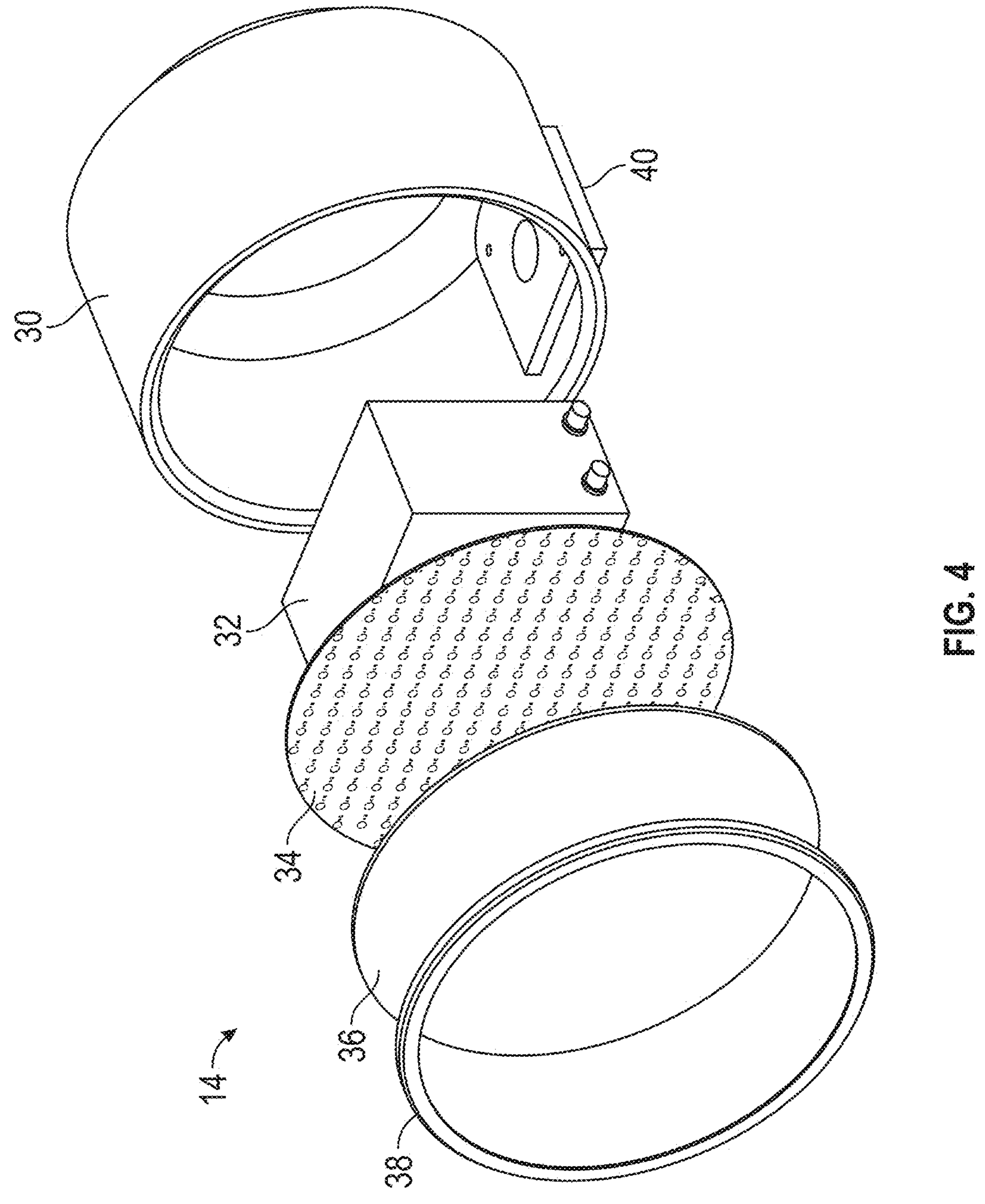
FIG. 4 shows an exploded view of a wireless light module for a traffic light system in accordance with the present disclosure.
Figure 5:
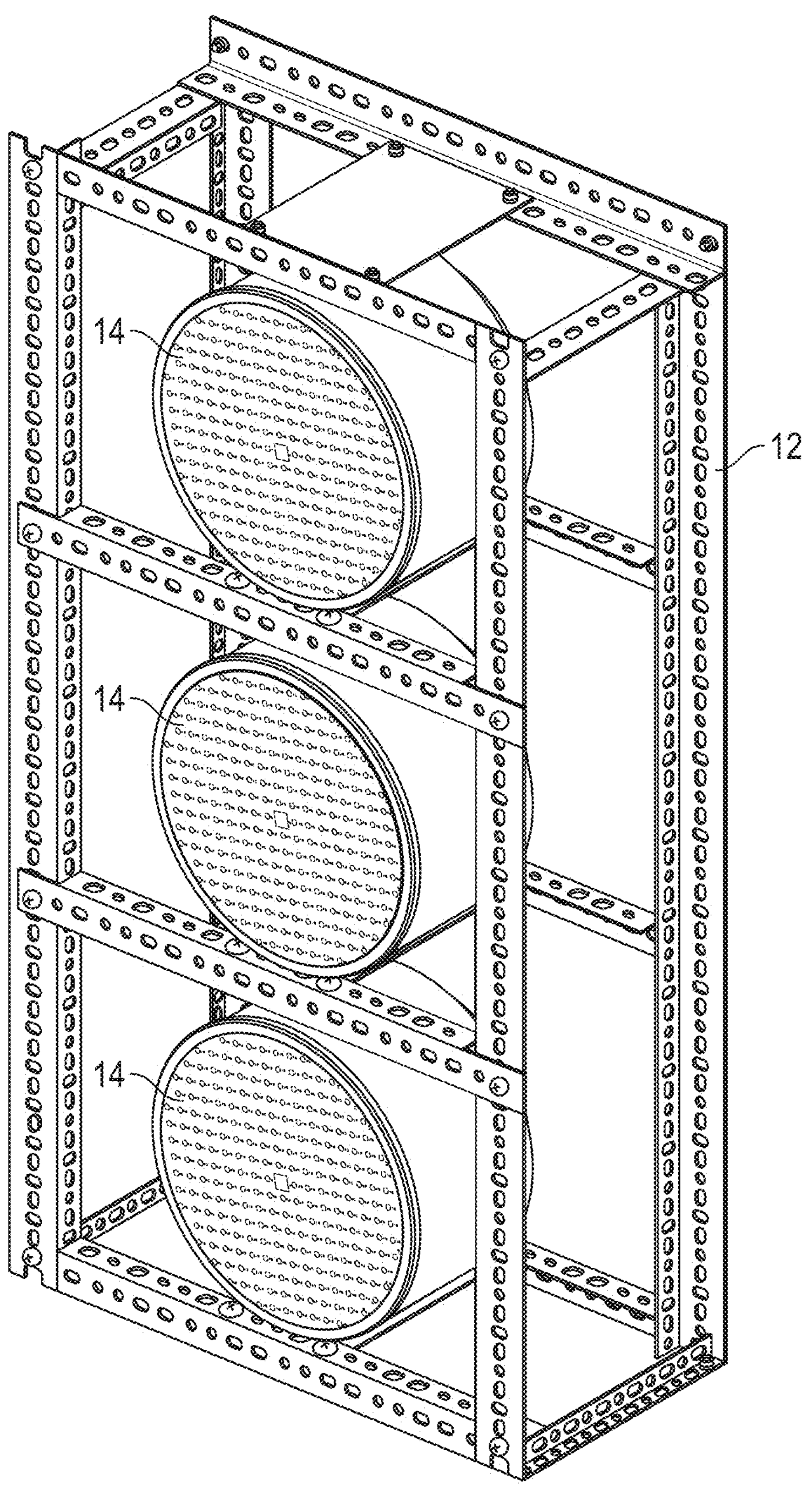
FIG. 5 shows light modules mounted onto a frame for a traffic light system in accordance with the present disclosure.
Figure 6:
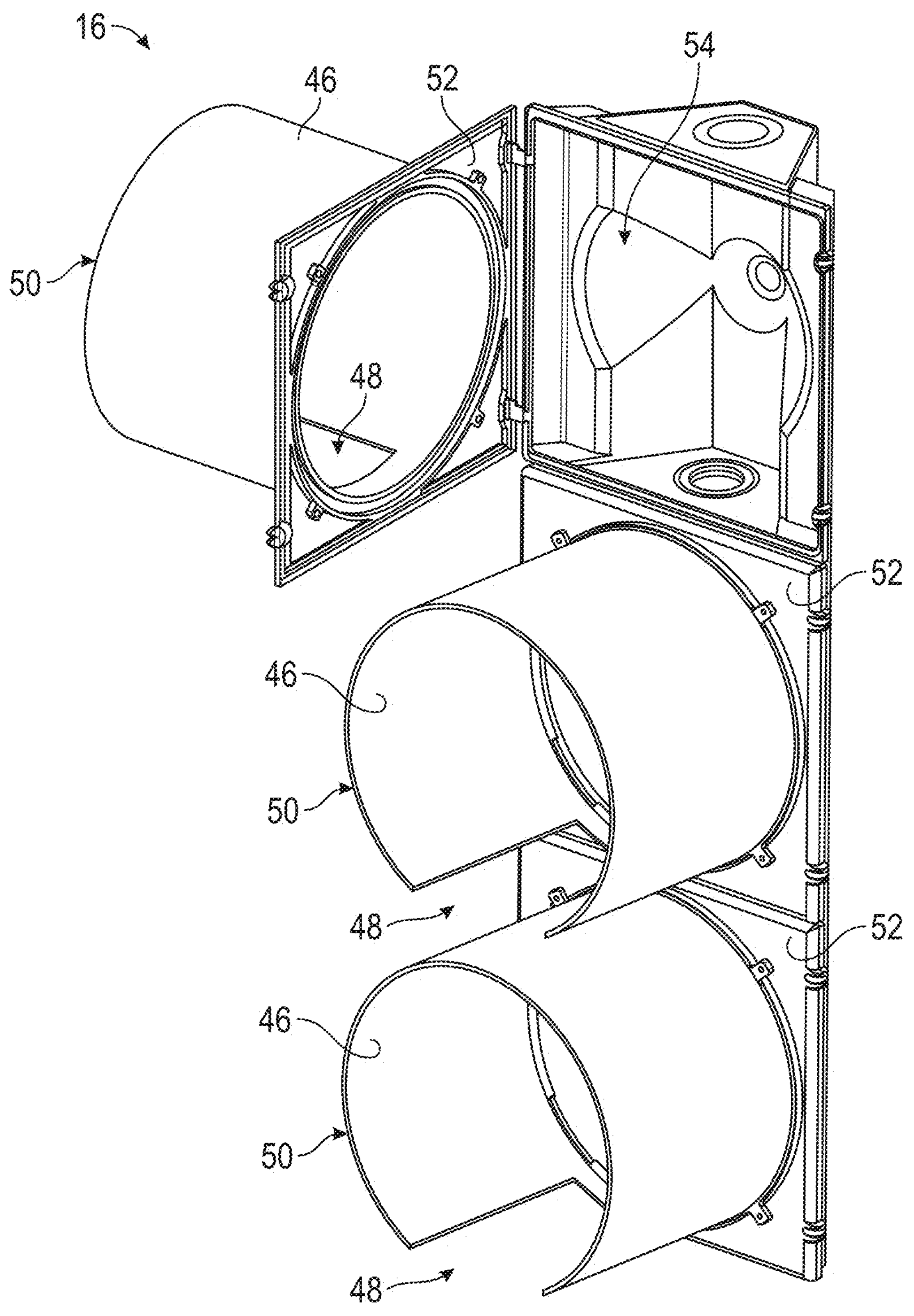
FIG. 6 shows an existing traffic light head onto which a frame with wireless light modules may be installed in accordance with the present disclosure.

In one aspect, a wireless traffic signal system 10 is provided. FIGS. 1-8 illustrate various components of one preferred embodiment of the present system 10. In a preferred embodiment, the system 10 is designed to be used with existing traffic light heads 16 so that the system 10 can be installed at an existing location already utilizing traffic signals for traffic control with minimal disruption to traffic flow during installation. FIG. 6 illustrates one example embodiment of an existing traffic light head 16 with which the system 10 may be utilized, though the system 10 may be modified to fit other designs of traffic light heads 16. The existing head 16 shown in FIG. 6 is a commonly used design having three visors 46 for three traffic signal lights, which are normally red, green, and yellow lights. The visors 46 are used to direct the signal indication of existing lights already installed on the traffic light head 16 in an appropriate direction toward approaching traffic and to reduce sun phantom. The existing traffic light head 16 is installed in a location for traffic control and is supported in an appropriate position over or adjacent to a roadway by existing infrastructure (not shown). FIG. 6 shows the head 16 with the existing conventional signal lights removed, though the existing lights do not need to be removed in order to install the present system 10 onto the existing head 16 with lights installed. Each of the visors 46 is configured to at least partially shield one of the existing traffic lights. In this embodiment, each of the visors 46 of the traffic light head 16 comprises a cylindrical housing that is hollow and open at a distal end 50. Each visor 46 may include a frame portion 52 to which the cylindrical housing is attached, and the frame portion 52 may be hingedly attached to the head 16 to facilitate installation and removal of conventional light signals used with the traffic light head 16. As shown in FIG. 6, the top visor 46 is shown in an open position, and the two bottom visors 46 are shown in a closed position for normal use. With the top visor 46 in the open position, an indented portion 54 is visible, which is where the conventional light signal would be installed for normal use of the traffic light head 16 without the present system 10.

In a preferred embodiment, as best seen in FIG. 6, each cylindrical housing of each visor 46 has a cutout portion 48. The cutout portion 48 is open at the distal end 50 of the housing and extends in an inward direction from the distal end 50 toward the frame portion 52 to which the cylindrical housing of the visor 46 is attached. The cutout portion 48 of each visor 46 is generally positioned at a lower end of the visor 46 that is vertically at a low point of the visor 46 when the traffic light head 16 is in an upright position for normal use, as shown in FIG. 6. This prevents accumulation of rain or snow within the interior of the visor 46 and also prevents birds from building nests within the visor 46, or the accumulation of dirt or other various types of debris, any of which would adversely affect operation of the traffic signals. This design of traffic light heads 16 with cylindrical visors 46 having cutout portions 48 is a standard configuration of traffic signals that is utilized in a majority of the traffic signals in the United States. In most cases, the cylindrical housing of the visor 46 has an internal diameter of approximately 12 inches.

Figure 2:
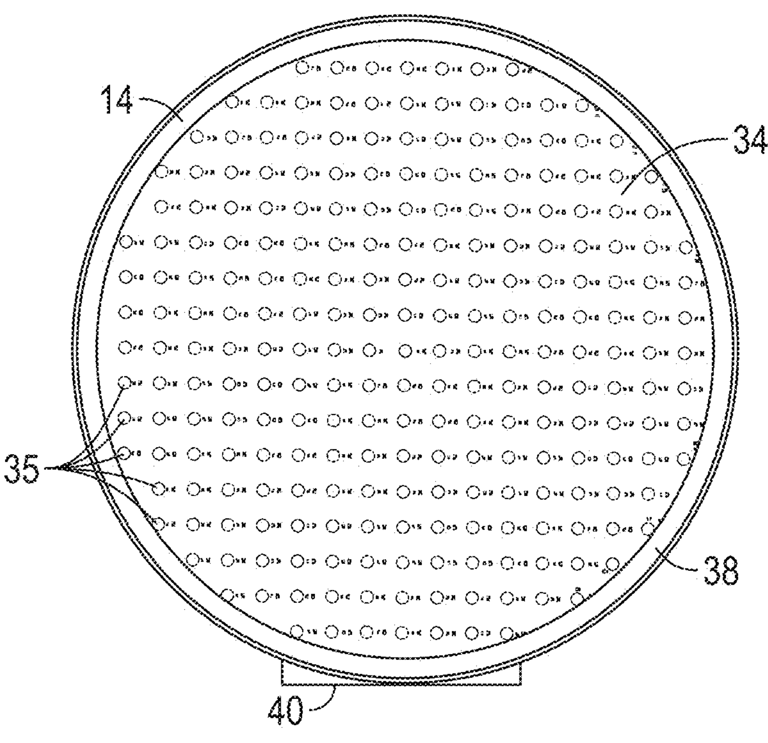
FIG. 2 shows a front view of a wireless light module for a traffic light system in accordance with the present disclosure.
Figure 3:
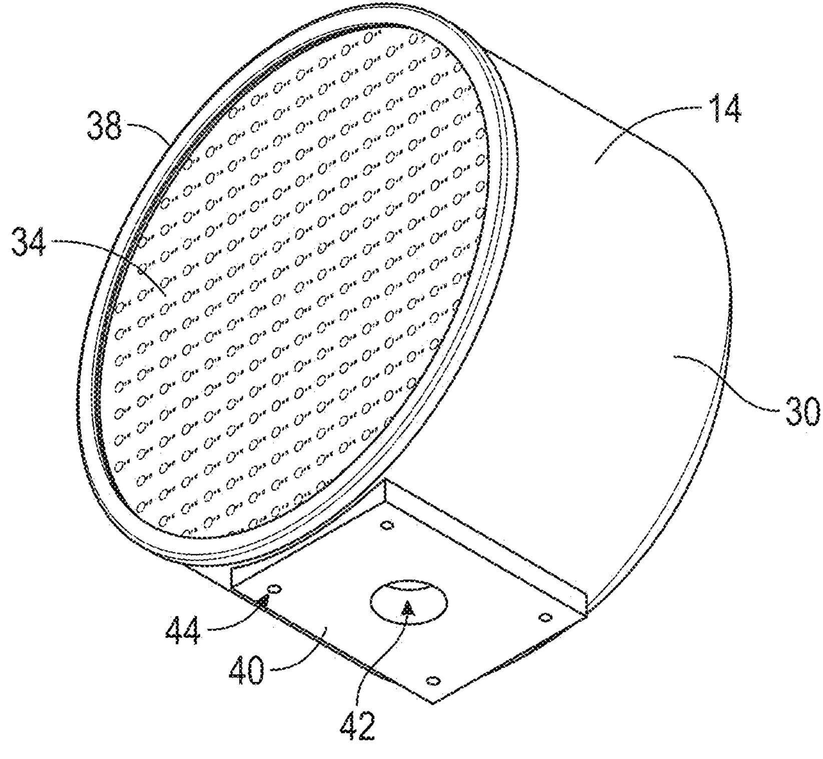
FIG. 3 shows a perspective view of a wireless light module for a traffic light system in accordance with the present disclosure.
Figure 8:
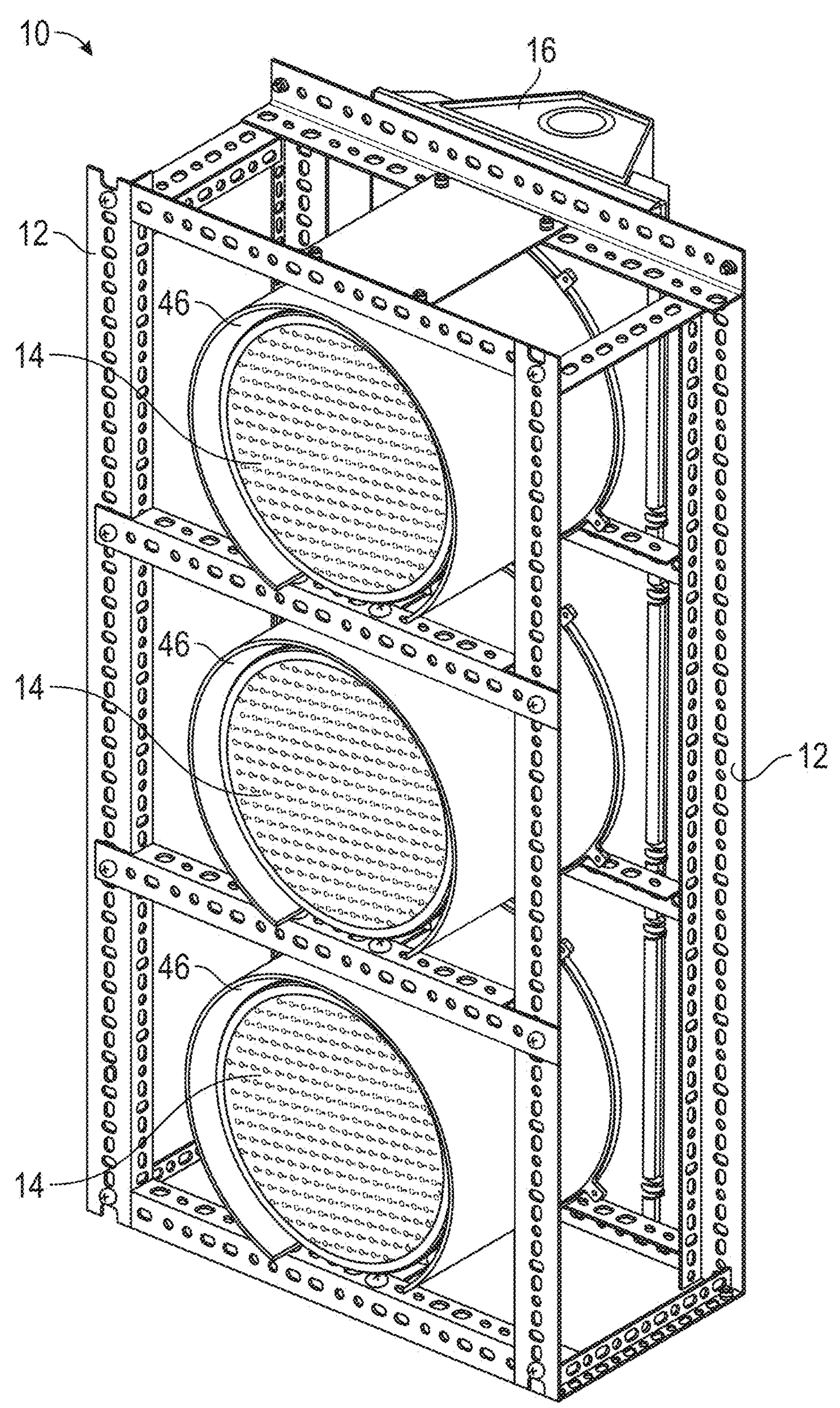
FIG. 8 shows a perspective view of a frame with wireless light modules installed on an existing traffic light head in accordance with the present disclosure.

The system 10 comprises one or more light modules 14 that are configured to be removably secured to the existing traffic light head 16. The light modules 14 preferably include standard red, green, and yellow lights, respectively, for traffic control but may include other colors. FIGS. 2 and 3 show an assembled light module 14, and FIG. 4 shows an exploded view of a light module 14. Each light module 14 comprises a housing 30 that can support a battery 32 and an LED (light emitting diode) light circuit board 34 or other type of light suitable for traffic control that can be powered by battery power or, alternatively, by conventional AC (alternating current) or DC (direct current) power. Each light module 14 preferably includes a transparent cover or screen 36 that covers and protects the LED light board 34. The housing 30 preferably has a generally cylindrical outer shape and is sized to fit within the interior of the cylindrical housing of one of the visors 46, as shown in FIG. 8. The LED light board 34 and screen 36 are preferably both circular in shape and are sized to fit within the interior of the module housing 30 at a position at an outer edge of the housing 30, as best seen in FIG. 3. The screen 36 may be retained in place by a bezel 38, which may include a seal to restrict moisture, dirt, or other debris from entering the interior of the module housing 30. The battery 32 is preferably housed within the interior of the module housing 30 and may be pre-wired to the LED light board 34 to provide power to a plurality of LED lights 35 mounted on the board 34. The battery 32 may also be wired to provide power to other boards 34 in a shared fashion.

In a preferred embodiment, as best seen in FIG. 2, the board 34 comprises an array of individual lights 35, which may be different colors so that the board 34 is capable of mixing colors to show a variety of different colors, including, but not limited to, red, green, and yellow. Each individual light chip 35 may have RGB diodes so that a full spectrum of colors is possible. The lights 35 may also be programmed to show various shapes, such as arrows, for specific traffic control functions.

Figure 1:
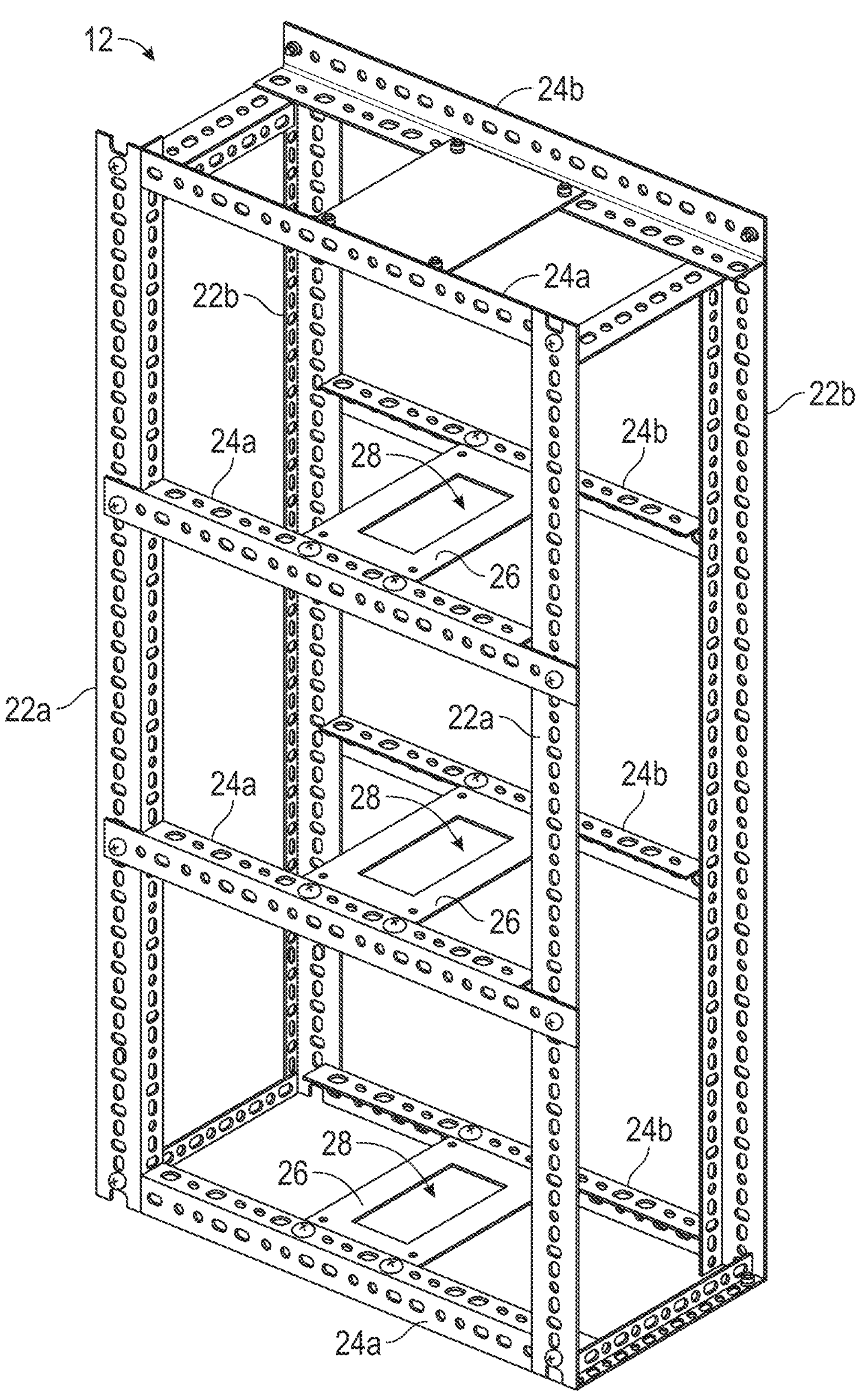
FIG. 1 shows a perspective view of a frame for supporting traffic lights in accordance with the present disclosure.
Figure 7:
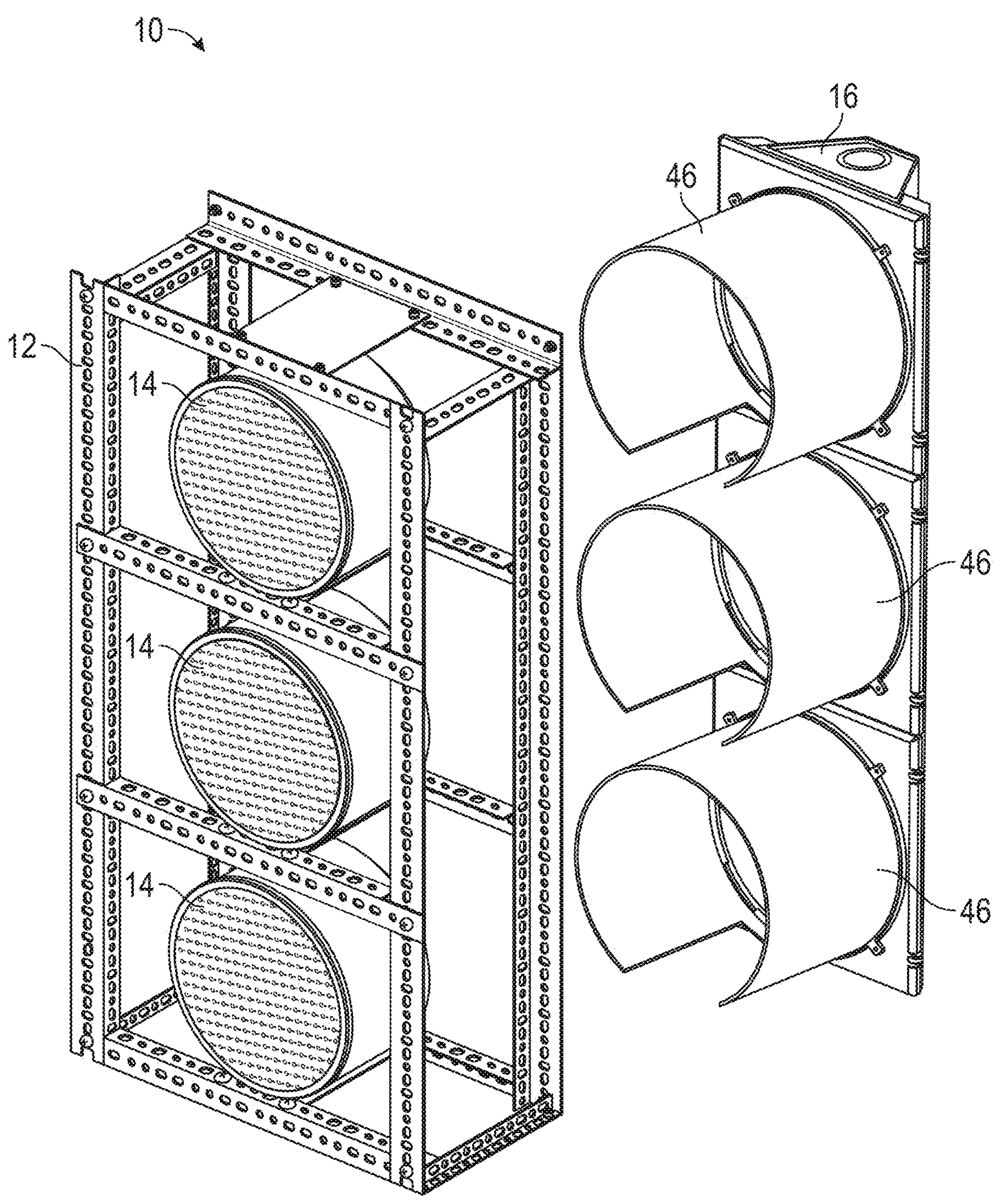
FIG. 7 shows an exploded view of a frame with wireless light modules and an existing traffic light head in accordance with the present disclosure.

In a preferred embodiment, the system 10 further comprises a frame 12 onto which each of the three light modules 14 may be mounted. FIG. 1 shows an example frame 12 that may be utilized with the present system 10, and FIG. 5 shows the light modules 14 mounted onto the frame 12 to form a single unit that includes the frame 12 and all light modules 14. This single unit may then be installed onto the existing traffic light head 16, as shown in FIG. 8. In a preferred embodiment, the frame 12 with mounted light modules 14 is configured to slide onto the existing traffic light head 16 with each of the light modules 14 being positioned within a respective one of the visors 46 so that the frame 12 and the light modules 14 mounted thereon are supported by the existing traffic light head 16. FIG. 7 shows the unit including the frame 12 and mounted light modules 14 positioned adjacent to the existing traffic light head 16 and aligned so that the unit may slide onto the traffic light head 16, and FIG. 8 shows the unit of frame 12 and light modules 14 after completely sliding the unit onto the traffic light head 16. Once in the position shown in FIG. 8, the frame 12 and light modules 14 are fully supported and held in place by the existing traffic light head 16 when the traffic light head 16 is in an upright vertical position for normal use. An additional fastening mechanism (not shown) may optionally be utilized for safety purposes to ensure that the frame 12 and mounted light modules 14 are securely fastened to the traffic light head 16, which ensures that the unit cannot be accidentally dislodged from the traffic light head 16 by high winds or other external forces during use of the system 10. The additional fastening mechanism may simply be a piece of cord, wire, rope, or similar type of flexible piece of material that can be used to secure the frame 12 to the existing head 16 or other infrastructure, or, alternatively, may be a threaded type of fastener or other similar type of fastener suitable for securing the frame 12 to a structural component. Such an additional fastener may prevent the unit from accidentally or inadvertently sliding off of the traffic light head 16 during use due to any external force.

Figure 16:
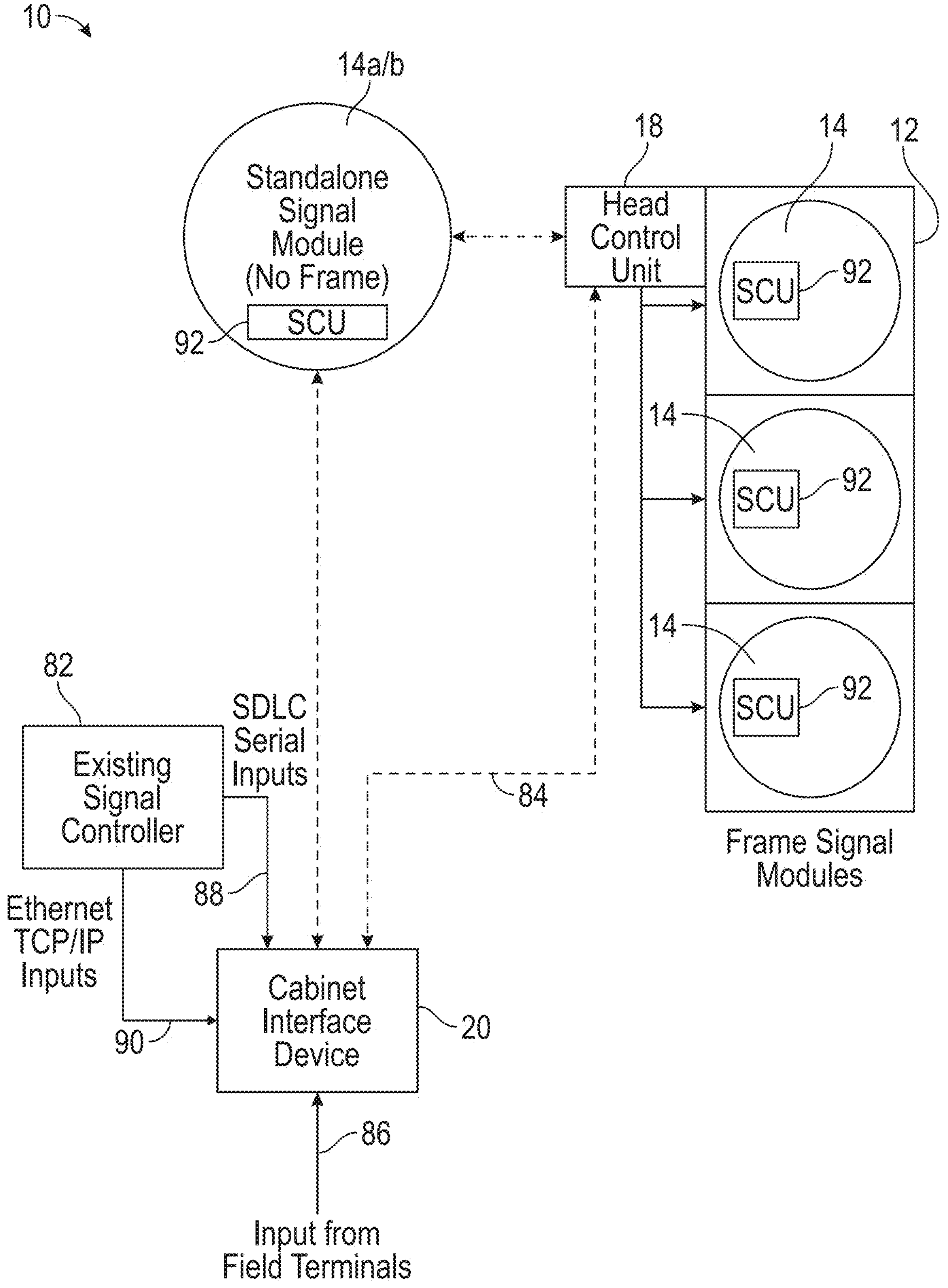
FIG. 16 shows a schematic diagram of a traffic light system in accordance with the present disclosure.

In a preferred embodiment, as best seen in FIG. 3, the housing 30 of each light module 14 comprises a bracket 40 configured to mount the light module 14 onto the frame 12. The bracket 40 may have a plurality of holes 44 for screws, bolts, or similar types of fasteners to securely mount the light module 14 onto the frame 12, which preferably includes mounting plates 26 having holes that align with the holes 44 on the light module bracket 40 to mount the module 14. Each light module bracket 40 may also have a larger opening 42 that allows access into the interior of the housing 30 in order to provide a passageway for wiring between the LED light board 34 and a wireless communications module 18 that is in communication with each of the attached light modules 14. The communications module 18 may be wired to all of the light modules 14 and mounted onto the frame 12 so that the communications module 18 is part of the single unit that is mounted onto the existing traffic light head 16, as shown in FIG. 16. The communications module 18 is configured to communicate wirelessly with a cabinet interface device 20 that is configured to control operation of the LED light boards 34 and to interface with an existing traffic signal cabinet 80 used for controlling the light signals of the existing traffic light head 16 when the present system 10 is not being utilized in place of the existing head 16. The mounting plates 26 on the frame 12 may each have a central opening 28 that aligns with the opening 42 in bracket 40 when each light module 14 is mounted onto the frame 12 to facilitate installation of the wiring between the module 14 and the communications module 18. Alternatively, the light module housing 30 may have an opening for wiring in another location of the housing.

In a preferred embodiment, the frame 12 and the light modules 14 are configured such that a respective one of the brackets 40 of each light module 14 fits into the cutout portion 48 of the cylindrical housing of a respective one of the visors 46 when each of the light modules 14 are positioned within a respective one of the visors 46 so that the frame 12 and the light modules 14 mounted thereon are supported by the existing traffic light head 16. Thus, when the unit of the frame 12 and mounted light modules 14 is aligned with the existing traffic light head 16, the portion of the unit where each light module bracket 40 is securely fastened to each frame mounting plate 26 may slide into each cutout portion 48 of each visor 46. The brackets 40 and mounting plates 26 are designed to not exceed the width of each cutout portion 48 so that this portion of the frame 12 and light module 14 unit fits into each cutout portion 48, thereby allowing each light module 14 to slide into the interior of each visor 46 of the traffic light head 16. Once each light module 14 is positioned within the interior of each visor 46, each light module 14 may rest on lower portions of an interior surface of each visor 46 on either side of the cutout portion 48 so that the visors 46 may collectively support the weight of the frame 12 and light modules 14, as shown in FIG. 8. This may be used as a temporary support while an additional securing mechanism is installed. The light modules 14 may each fit within one of the visors 46 with each of the existing light signals previously installed on the head 16 for use without the present system 10 being positioned behind each respective one of the light modules 14. Thus, the existing signal lights do not have to be uninstalled from the traffic light head 16 before installation of the present system 10 over the existing traffic lights.

Once the present system 10 is installed, the lights 35 may run off of battery 32 power or, optionally, AC power, DC power, or any combination thereof, and the system 10 may be programmed to wirelessly control operation of the lights 35. Before installation of the system 10, the light modules 14 and wireless communications module 18 may be mounted onto the frame 12 and wired to each other so that installation of the unit (including frame 12, light modules 14, and communications module 18 all physically connected to each other) onto an existing traffic light head 16 requires minimal time. Thus, for instance, if existing traffic lights at an intersection need to be taken out of service for upgrades or repairs, traffic only needs to be disrupted for a minimal amount of time that is necessary for the unit to be installed. Because installation only requires the unit to slide onto the existing traffic light head 16 and then optionally to be secured with an additional fastener for safety purposes, installation can be performed quickly to minimize traffic disruptions. Installation of the system 10 onto the traffic light head 16 does not require separate installation of wires from the frame 12 and light module 14 unit to a power source or control system. Once the system 10 is installed, the light boards 34 may be wirelessly programmed to control traffic based on the specific requirements of the installation location. In additional, multiple units can be installed on multiple existing traffic light heads 16 at an intersection, and all of the units may be wirelessly programmed to function collectively to control traffic at the intersection using a common interface device 20 that communicates with the wireless communications module 18 of each of the individual units that are installed on different traffic light heads 16 around the intersection.

FIG. 1 shows one preferred embodiment of the frame 12 that may be utilized with the present system 10. This frame 12 is specifically configured to be compatible with the traffic light head 16 shown in FIG. 6, which is a commonly utilized design for existing traffic lights. It should be understood by one of skill in the art that other configurations of frames 12 may be utilized to be compatible with other configurations of traffic light heads 16 and still fall within the scope of the present disclosure if the frame 12 and light modules 14 are capable of being mounted onto the traffic light head 16 and supported in place on the traffic light head 16 without modification of the existing head 16 or other existing structural components that support the existing head 16.

In a preferred embodiment, as best seen in FIG. 1, the frame 12 comprises a plurality of vertical frame members 22 and a plurality of rigidly interconnected horizontal frame members 24 when the frame 12 is in an upright position. The vertical and horizontal frame members 22 and 24 collectively form a frame structure that is suitable for mounting the light modules 14 onto the frame 12. In a more preferred embodiment, the frame 12 comprises four vertical frame members 22 and at least six horizontal frame members 24, and more preferably eight horizontal frame members 24, that form a three-dimensional frame structure that has a generally rectangular cuboidal shape. Each of the vertical frame members 22 is generally parallel to each of the other vertical frame members 22, and each of the horizontal frame members 24 is also generally parallel to each of the other horizontal frame members 24. Each of the vertical frame members 22 is also generally perpendicular to each of the horizontal frame members 24.

In this embodiment, the vertical frame members 22 include two front vertical frame members **22*a* and two rear vertical frame members 22*b*, and the horizontal frame members 24 also include both front horizontal frame members 24*a* and rear horizontal frame members 24*b*. Each of the front vertical frame members 22*a* are spaced apart from each of the rear vertical frame members 22*b* a distance sufficient to accommodate the depth of each of the light modules 14, which is primarily defined by the depth of the housing 30 of each module 14 from the screen 36 to a rear of the module 14, as best seen in FIG. 5. Each mounting plate 26 is mounted onto and supported by a pair of horizontal frame members 24, one of which is connected to both of the front vertical frame members 22*a* and one of which is connected to both of the rear vertical frame members 22*b*. The mounting plates 26 are preferably mounted at a midpoint between each of the two front vertical frame members 22*a* and between each of the two rear vertical frame members 22*b*. Each of the front vertical frame members 22*a* and each of the rear vertical frame members 22*b* are spaced apart from each other a distance sufficient to accommodate each of the light modules 14 between the front members 22*a* and between the rear members 22*b* with some excess space on either side of each module 14 to allow for mounting the modules 14 onto the frame 12, as best seen in FIG. 5, and also to allow for mounting the frame 12 and modules 14 onto the existing traffic light head 16, as shown in FIG. 8. As best seen in FIGS. 1 and 5, the vertical frame members 22 preferably extend above the mounting plate 26 that supports the uppermost light module 14, and the frame 12 preferably also includes a pair of horizontal frame members 24 disposed above the uppermost light module 14 for added structural strength of the frame 12**.

As previously discussed, the portion of the frame 12 and light module 14 unit where each light module bracket 40 is securely fastened to each frame mounting plate 26 may slide into each cutout portion 48 of each visor 46. In an alternative embodiment, each light module 14 may be mounted onto the frame 12 in a different configuration. For instance, in an embodiment in which the existing traffic light head 16 has visors 46 that do not have a cutout portion 48, the mounting configuration of the modules 14 onto the frame 12 may be adjusted to work with the existing head 16. In such an embodiment, the mounting plates 26 may be omitted and the modules 14 may be mounted onto only the front horizontal frame members **24*a* at a front end of each of the light modules 14 so that the frame 12 with mounted light modules 14 may still slide onto the existing head 16 with the light modules 14 positioned within an interior of each of the visors 46. It should be understood by one of skill in the art that other configurations of frames 12 and light modules 14, including mounting configurations for mounting the light modules 14 onto a frame 12, may be utilized to be compatible with a specific design of an existing traffic light head 16** and still fall within the scope of the present disclosure.

In one alternative embodiment, the system 10 may be designed for use with pedestrian lights, which typically have visors 46 having a generally squared shape, which may or may not include cutout portions 48. In this embodiment, the light module 14, including the module housing 30 and light board 34, may have a generally squared shape, preferably with rounded corners, to be compatible with an existing light head 16 designed for pedestrian lights. In this embodiment, the frame 12, mounting brackets 26, and module brackets 40 may be designed to be mounted onto the pedestrian light head. Alternatively, the frame 12 and light modules 14 mounted thereon may be configured to be mounted onto a pedestrian light head having visors 46 without cutout portions 48. In another alternative embodiment, each light module 14 may be configured to be individually mounted onto a squared visor 46 of a pedestrian light head, as discussed below.

FIGS. 9-13 illustrate alternative embodiments of light modules 14*a* and 14*b* that are individually configured to be removably secured to a visor 46 of an existing traffic light head 16. In these alternative embodiments, a frame 12 is not utilized, and instead each light module 14*a* and 14*b* is mounted individually onto one respective visor 46.

Figure 9:
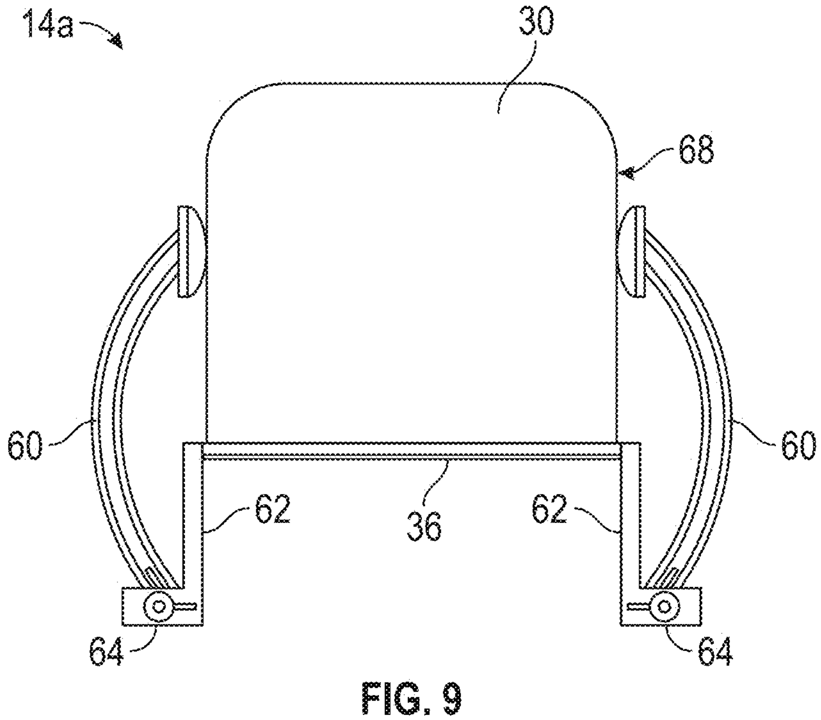
FIG. 9 shows a side view of an alternative embodiment of a wireless light module for a traffic light system in accordance with the present disclosure.
Figure 10:
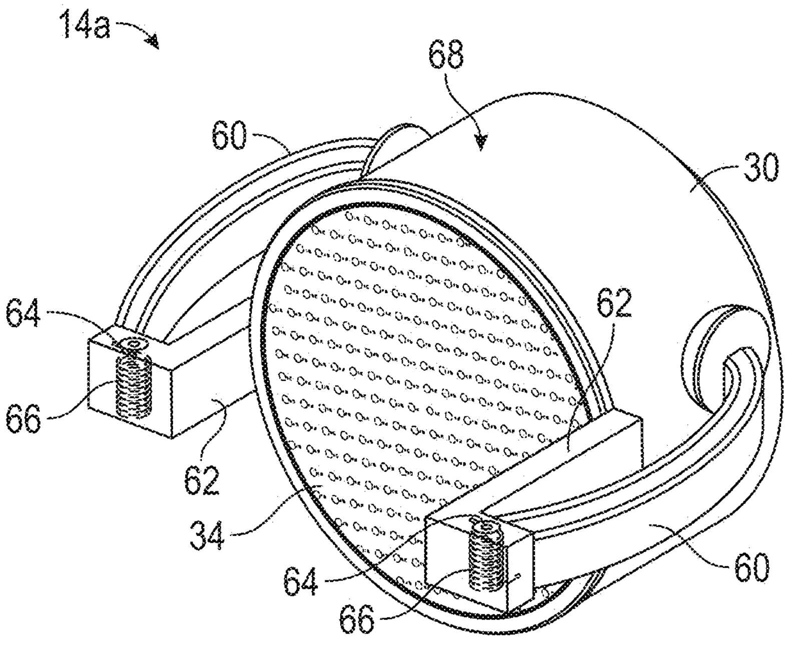
FIG. 10 shows a perspective view of an alternative embodiment of a wireless light module for a traffic light system in accordance with the present disclosure.
Figure 11:
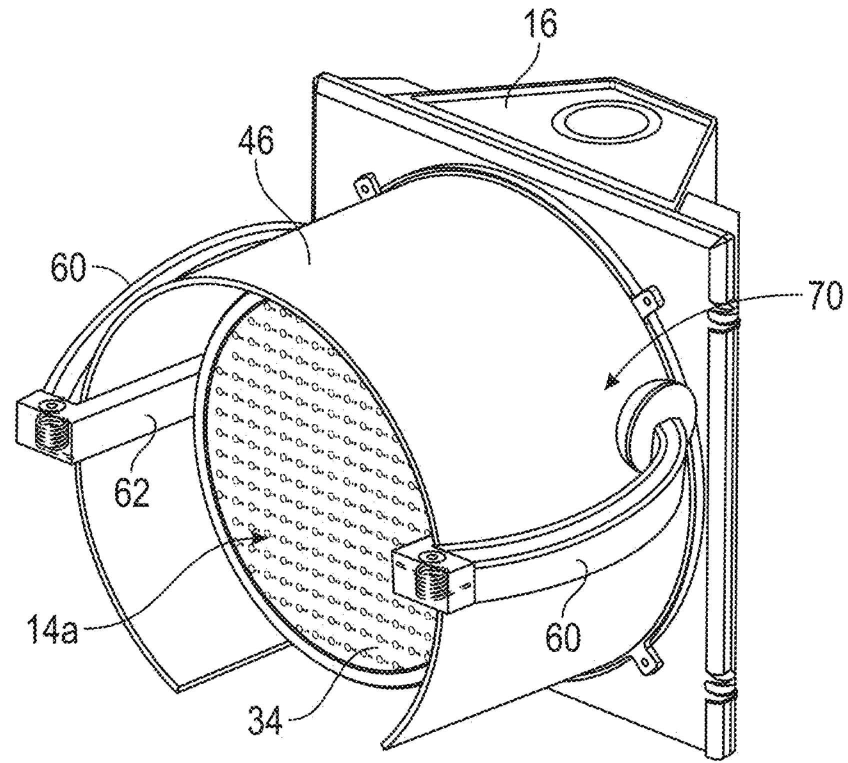
FIG. 11 shows a perspective view of a wireless light module mounted onto a visor of an existing traffic light head in accordance with the present disclosure.

In one alternative embodiment, as shown in FIGS. 9-11, a light module 14*a* comprises an opposing pair of arms 60 that are each resiliently biased inwardly toward an exterior surface 68 of the housing 30 of the light module 14*a*. The light module 14*a* and opposing pair of arms 60 are configured to removably secure the light module 14*a* to the visor 46 of an existing traffic light head 16 with the housing 30 of the light module 14*a* positioned within an interior of the visor 46 with the arms 60 positioned outside the visor 46 and resiliently biased against an exterior surface 70 of the visor 46, as shown in FIG. 11. The arms 60 are preferably attached to the light module 14*a* by hinges 64, each of which may include a spring 66 configured to cause the arms 60 to be resiliently biased inwardly toward the exterior surface 68 of the housing 30. As best seen in FIGS. 9 and 10, each of the hinges 64 may be attached to the module housing 30 by one of two opposing extension arms 62, which may allow the module 14*a* to be recessed within the visor 46 such that the screen 36 is disposed with the interior of the visor 46 at a position that is proximal to the distal end 50 of the visor 46, as shown in FIG. 11. Thus, extension arms 62 preferably extend in a distally outward direction from the screen 36, as best seen in FIG. 9, and when the module 14*a* is secured to the visor 46 the extension arms 62 preferably extend in a distally outward direction beyond the distal end 50 of the visor 46, as best seen in FIG. 11. To removably secure the module 14*a* to the visor 46, the arms 60 may be moved outwardly against the biasing force of each of the springs 66 and held in place, and the module 14*a* may then be inserted into an interior of the visor 46. The arms 60 may then be released to forcibly apply pressure to the exterior surface 70 of the visor 46 due to the biasing force of the springs 66, which then retains the module 14*a* in a fixed position on the visor 46 for normal use.

Figure 12:
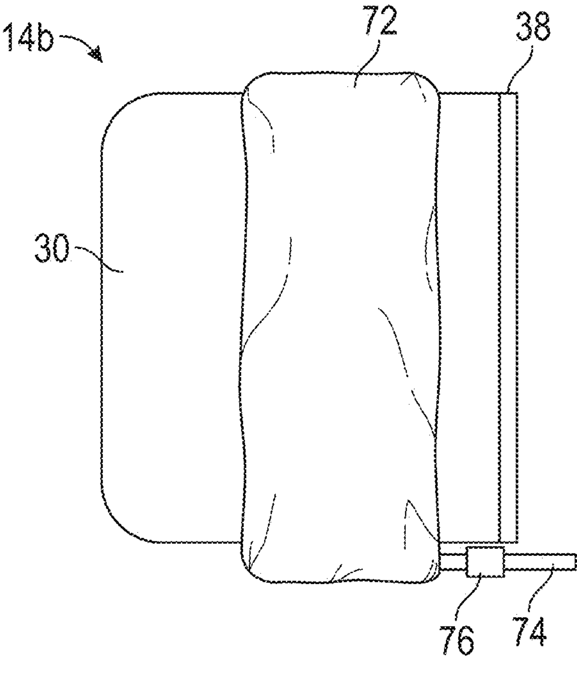
FIG. 12 shows a side view of an alternative embodiment of a wireless light module for a traffic light system in accordance with the present disclosure.
Figure 13:
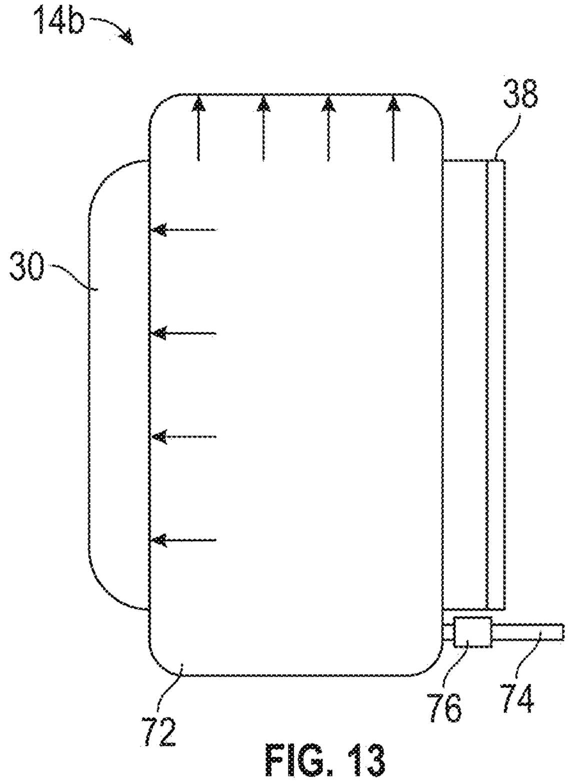
FIG. 13 shows a side view of an alternative embodiment of a wireless light module for a traffic light system in accordance with the present disclosure.

In another alternative embodiment, as shown in FIGS. 12-13, a light module 14*b* comprises an inflatable pouch 72 attached to the housing 30 and disposed on an exterior 68 of the housing 30 of the light module 14*b*. The light module 14*b* fits within an interior of a visor 46 when the pouch 72 is deflated, as shown in FIG. 12, and the light module 14*b* is removably secured to the visor 46 by outward pressure exerted onto an interior surface of the visor 46 by the pouch 72 when the light module 14*b* is positioned within an interior of the visor 46 and the pouch 72 is inflated, as shown in FIG. 13. The arrows shown in FIG. 13 indicate outward pressure exerted by the pouch 72 when inflated. The pouch 72 preferably comprises a tube 74 designed to allow the pouch 72 to be inflated and deflated through the tube 74, which is preferably positioned at a forward or distal end of the light module 14*b* to allow inflation and deflation when the module 14*b* is positioned within a visor 46. To removably secure the module 14*b* to the visor 46, the pouch 72 may be deflated and the module 14*b* may then be placed into the interior of the visor 46, at which point the pouch 72 may be inflated through the tube 74 to apply outward pressure onto an interior surface of the visor 46, thereby removably securing the module 14*b* to the visor 46. The tube 74 may have a check valve 76 to maintain pressure within the pouch 72. To remove the module 14*b* from the visor 46, pressure within the pouch 72 may be relieved through the tube 74 using the check valve 76 to at least partially deflate the pouch 72, at which point the light module 14*b* may be removed from the interior of the visor 46.

The alternative embodiments shown in FIGS. 9-13 illustrate two possible embodiments configured for individually securing a light module 14 to an existing traffic light head 16. It should be understood by one of skill in the art that other configurations of light modules 14 may be utilized for individually securing a light module 14 to an existing traffic light head 16 and still fall within the scope of the present disclosure. In these alternative embodiments, the wireless communications module 18 may be mounted onto the existing traffic light head 16, onto one of the light modules 14*a/b*, or may be mounted in another suitable location. The wireless communications module 18 may be either wired to the light modules 14*a/b* to communicate with the light modules 14*a/b*, or module 18 may be configured for wireless communication with the light modules 14*a/b*.

Figure 15:
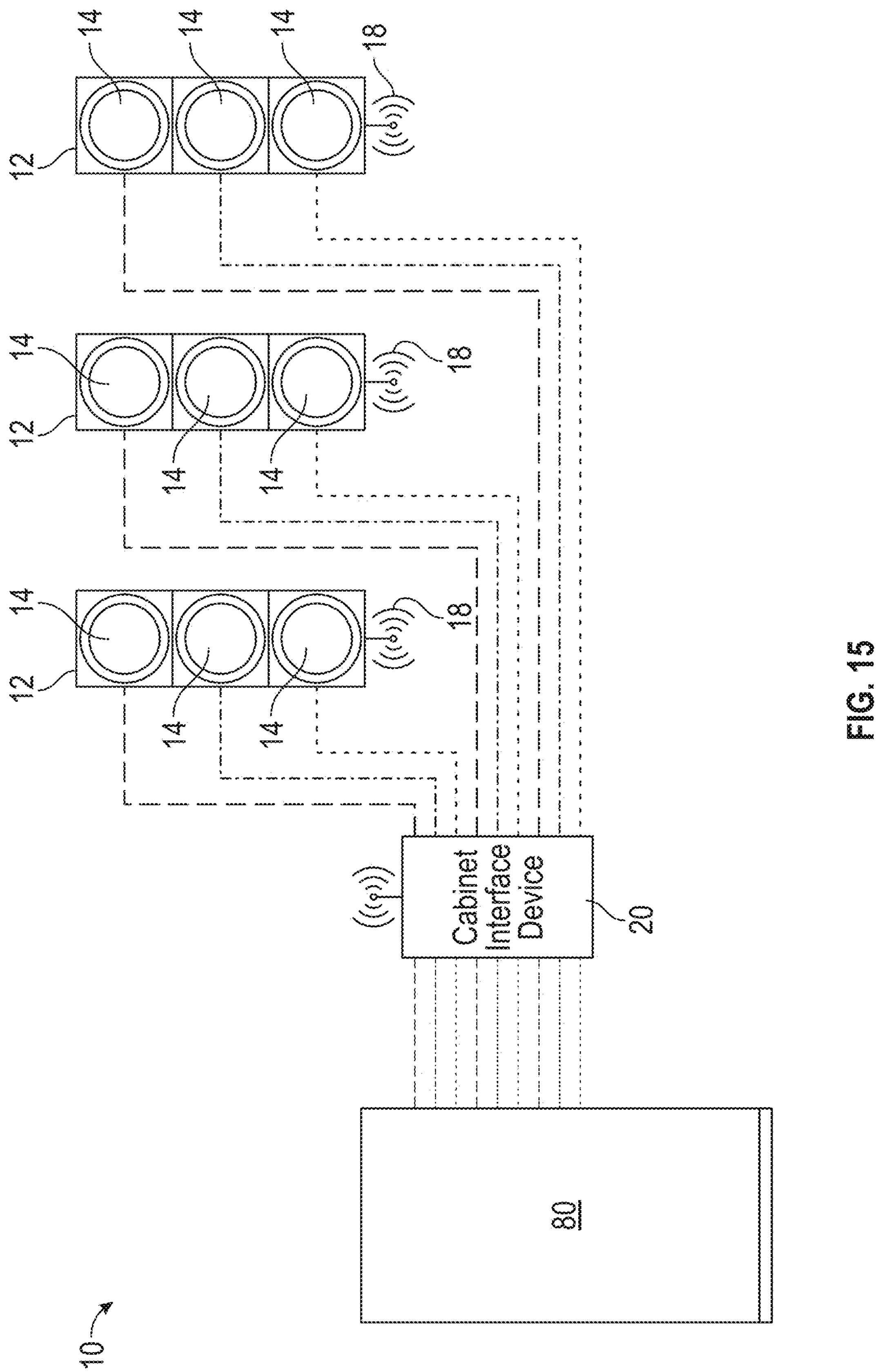
FIG. 15 shows a schematic diagram of a traffic light system in accordance with the present disclosure.

The communications module 18 is configured to communicate wirelessly with a cabinet interface device 20 that is configured to wirelessly control light signals emitted by each of of the LED light boards 34 of the light modules 14 and to interface with an existing traffic signal cabinet 80 used for controlling the light signals of the existing traffic light head 16 when the present system 10 is not being utilized. FIG. 15 illustrates a schematic diagram of the existing traffic signal cabinet 80, the cabinet interface device 20, and a plurality of separate units each comprising a frame 12, light modules 14, and a wireless communications module 18 that allows wireless communication with the cabinet interface device 20. It should be understood that additional or fewer units of light modules 14 may be utilized with a single cabinet interface device 20 and traffic signal cabinet 80. Interface device 20 is configured to interface between the traffic signal cabinet 80 and units of light modules 14 via communications module 18. Cabinet interface module 20 may comprise a transmitter and antenna, and communications module 18 may comprise an antenna and receiver to facilitate communication of wireless data signals 84 between interface device 20 and communications module 18. The wireless link 84 between interface device 20 and communications module 18 may utilize radio frequency signals or any other suitable wireless communications method. Thus, the present system 10 allows each of the light modules 14 to communicate with a paired device 20, which is preferably located in the traffic signal cabinet 80, or with any other control or monitoring devices.

Figure 14:
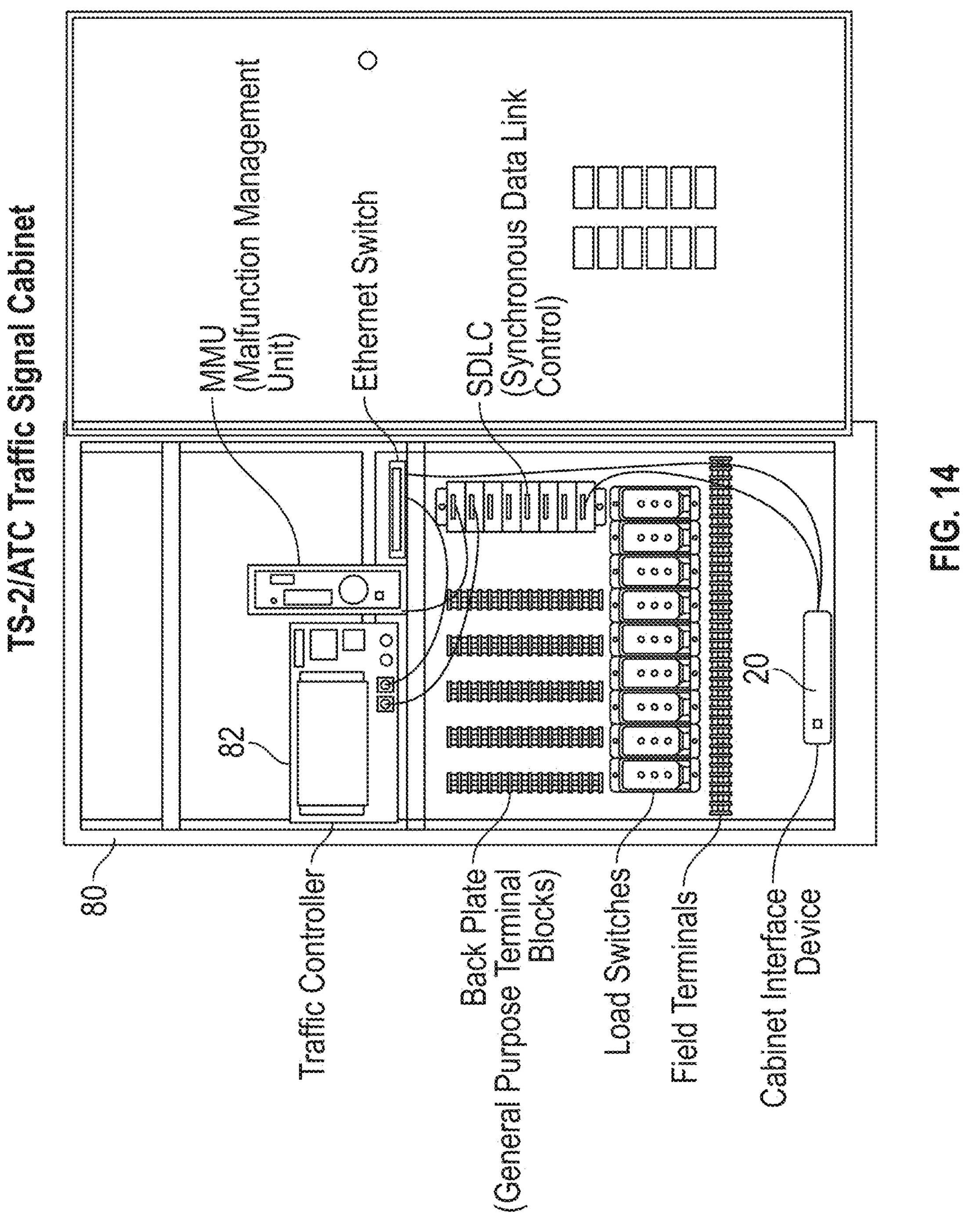
FIG. 14 shows a front view of a traffic signal cabinet for a traffic light system in accordance with the present disclosure.

FIG. 14 illustrates an example embodiment of a traffic signal cabinet 80. The cabinet 80 comprises a traffic signal controller 82 that is configured to control operation of standard traffic lights installed on the one or more existing traffic light heads 16. The cabinet 80 may include standard components for controlling traffic signals, including, but not limited to, the traffic signal controller 82, an SDLC (synchronous data link control) system, an MMU (malfunction management unit), load switches, field terminals, and an Ethernet switch. The present system 10 further comprises the cabinet interface device 20, which provides a programmable interface between the traffic signal controller 82 of the existing cabinet 80 and the light modules 14. Interface device 20 may be connected to outputs of controller 82. Thus, once the present system 10 is installed onto existing traffic light heads 16, the cabinet interface device 20 may be used to wirelessly interface with each of the light boards 34 to control traffic based on the specific requirements of the installation location. Multiple units of light modules 14 can be installed on multiple existing traffic light heads 16 at an intersection, and all of the individual light modules 14 may be programmed to synchronously function to control traffic at the intersection using a single interface device 20 installed in a single cabinet 80 that communicates with the wireless communications modules 18 of each of the individual units of light modules 14, which are installed on different traffic light heads 16 around the intersection. By using outputs from the existing traffic signal controller 82, the timings for all directions can be controlled by a single interface device 20 in the same manner as during normal operation. Communications modules 18 of individual traffic heads may transmit data 84 back to interface device 20 to prevent conflicting indications from being displayed. Interface device 20 may use standard protocols, such as NTCIP (National Transportation Communications for Intelligent Transportation) system protocols, or manufacturer-specific applications of SNMP (Simple Network Management Protocol) over Ethernet. Additionally, the interface device 20 may be wired to the cabinet 80 outputs 86 going to existing traffic signal heads. Interface device 20 may comprise one or more microcontrollers 100, 102.

FIG. 16 illustrates an overall schematic diagram of the present system 10. The dashed lines in FIG. 16 indicate wireless communications 84 between various components of the system. FIG. 16 schematically illustrates functioning of the system 10 using either an embodiment in which multiple light modules 14 are installed on a frame 12 for each existing traffic light head 16 or an embodiment utilizing individually mountable light modules 14*a/b*. The light board 34 of each light module 14, 14*a*, 14*b* may include a signal control unit (SCU) 92 in communication with module 18. Each SCU 92 may comprise a microcontroller as well as transistors and relays or other suitable switching devices. The cabinet interface device 20 includes inputs 86 from field terminals, as well as SDLC serial inputs 88 and/or Ethernet TCP/IP (transmission control protocol/internet protocol) inputs 90 from the existing signal controller 82 of the traffic signal cabinet 80. The cabinet interface device 20 is designed to utilize existing traffic signal control infrastructure to wirelessly control multiple light modules 14 installed over existing traffic signal hardware 16, which allows for simple and fast installation of the system 10 for minimal traffic disruptions. After installation, the cabinet interface device 20 may be connected to the existing infrastructure and the system may be programmed to control the light boards 34. Output channels may be added to any existing cabinet 80 by communicating directly with the traffic signal controller 82 and MMU. This can be done even when all available load switches and their channels are in use.

The CID is only relaying outputs from the existing controller to the wireless signals.

Figure 17:
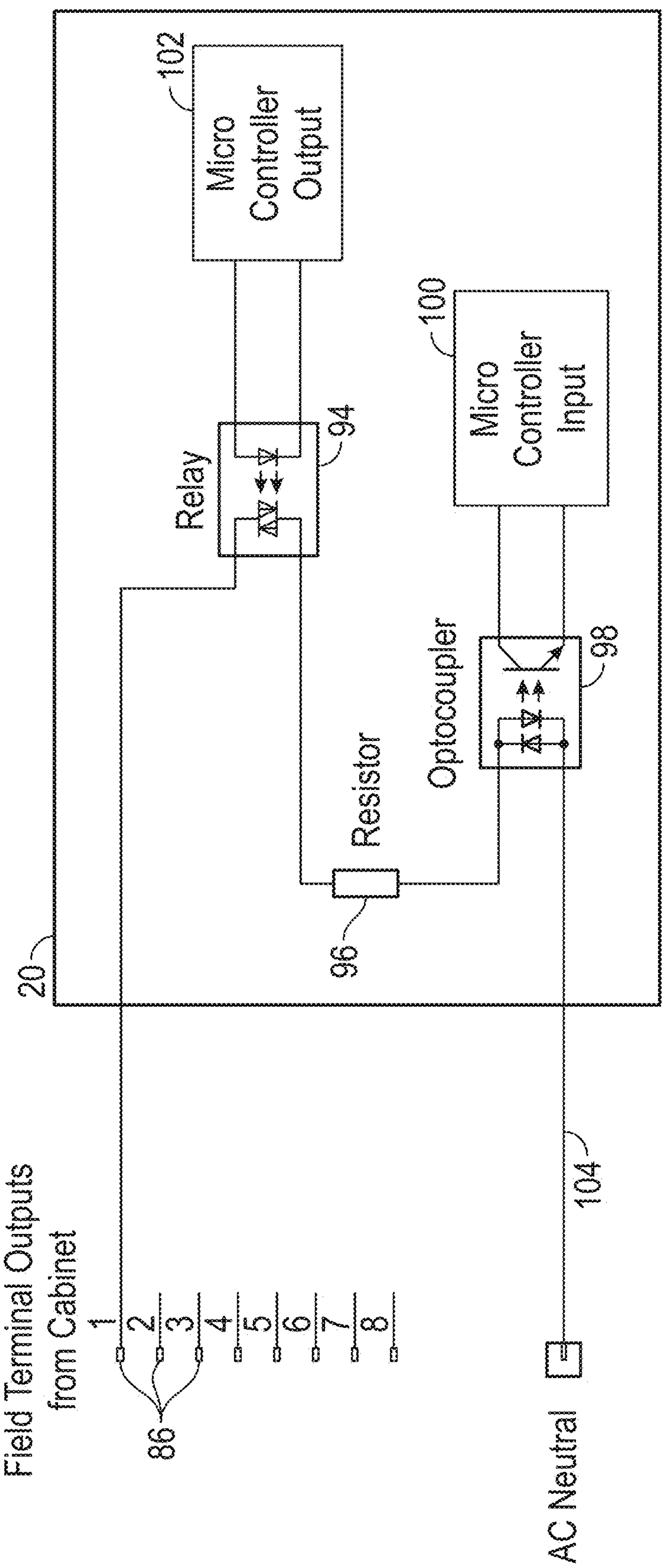
FIG. 17 shows a schematic diagram of a traffic signal cabinet interface device in accordance with the present disclosure.

FIG. 17 shows a schematic diagram of the cabinet interface device 20. The cabinet interface device 20 is configured to transmit an output status from the existing traffic signal controller 82 to control light signals emitted from each of the LED light boards 34 of each of the light modules 14. Thus, connecting the cabinet interface device 20 to the existing traffic signal cabinet 80 allows the system to utilize the existing traffic signal controller 82 to control all of the newly installed wireless light modules 14. The interface device 20 is utilized to relay outputs 86 from the existing signal controller 82 to the wireless light modules 14. The interface device 20 may comprise one or more process controllers, which are preferably microcontrollers 100, 102. In a preferred embodiment, the cabinet interface device 20 comprises a set of inputs locations into which field terminal outputs 86 from the traffic signal cabinet 80 can be plugged in to read the AC outputs 86 of the traffic signal cabinet 80. Thus, the interface device 20 may be wired to the cabinet 80 outputs 86 that were previously wired to existing traffic signal heads 16. These set of inputs further comprises at least one relay 94, behind which is at least one optocoupler 98 to allow reading of the input 86 from the field terminals. The interface device 20 further comprises at least one resistor 96 operably connected to a shared neutral wire 104 connected back to the traffic signal cabinet 80. The at least one resistor 96 is configured to mimic the load of existing traffic lights of existing light heads 16 that were previously wired to the existing traffic signal cabinet 80. Traffic lighting systems are typically powered by 120V AC power systems. A microcontroller 100, 102 may be configured to read the voltage of the system and an output 102 from the microcontroller may control the relay 94 based on the voltage reading. The microcontroller 100, 102 can kill power to the system by switching the relay 94 if the voltage is incorrect. The optocoupler 98, or opto-isolator, is configured to convert the voltage signal into light and eliminates the need to connect an external power source to the device 20. A microcontroller 100 may be operably connected to the optocoupler 98 and configured to wirelessly communicate with the communications module 18 that is in communication with each of the light modules 14 so that the microcontroller input 100 may be used to control the light modules 14. The shared neutral wire 104 connected to the traffic signal cabinet 80 is also operatively connected to the optocoupler 98. The relays 94 and resistors 96 of the cabinet interface device 20 allow proper operation with, and the ability to report failures to, the existing signal controller 82 and malfunction monitoring unit of the traffic signal cabinet 80. In alternatively embodiments, communication with existing infrastructure may be accomplished via SDLC or Ethernet as provided by NEMA (National Electrical Manufacturers Association) TS2 and NTCIP 1202 standards, respectively.

The present system 10 is generally designed for temporary use while the existing system is out of service or during repairs, upgrades, or other work such as road construction work, though in some embodiments the present system 10 may be utilized as a permanent or semi-permanent installation. For instance, in some embodiments, the batteries 32 used to power the light modules 14 may be recharged utilizing one or more solar panels, which may be installed on the existing traffic signal head 16 or other infrastructure supporting the existing lights. In other optional embodiments, the system 10 may include a charging circuit that may be installed and connected to each light module 14 through an optional power port. The use of a charging circuit may allow for indefinite run times for the present system, which may allow the system to be used not only for short-term use but also during long-term construction projects or other lengthy outages of an existing system, or optionally for permanent installations. In a preferred embodiment, when using the system 10 with only battery power, the batteries 32 are designed to allow for a defined minimum run time to provide a sufficient amount of time to repair or upgrade the existing system before returning the existing system to service.

It will be appreciated that the configurations and methods shown and described herein are illustrative only, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein. It is understood that versions of the invention may come in different forms and embodiments. Additionally, it is understood that one of skill in the art would appreciate these various forms and embodiments as falling within the scope of the invention as disclosed herein.

What is claimed) is:

1. A wireless traffic signal system comprising:

an existing traffic light head comprising a plurality of visors each configured to at least partially shield a light;

an existing traffic signal controller wired to an existing traffic light comprising a first set of lights, wherein the existing traffic signal controller is configured to control operation of the existing traffic light in a wired configuration;

a plurality of light modules comprising a second set of lights separate from the first set of lights and configured for wireless control, wherein each of the plurality of light modules comprises a housing that supports a light source;

a frame, wherein each of the plurality of light modules is mounted onto the frame, wherein the frame is configured to slide onto the existing traffic light head with each of the plurality of light modules being positioned within a respective one of the plurality of visors such that the frame and the plurality of light modules mounted thereon are supported by the existing traffic light head;

a wireless communications module in communication with each of the plurality of light modules; and a cabinet interface device configured to communicate wirelessly with the wireless communications module, wherein the cabinet interface device is operably connected to the existing traffic signal controller and is configured to transmit an output status from the existing traffic signal controller to allow the existing traffic signal controller to wirelessly control light signals emitted by the light source of each of the plurality of light modules in a wireless configuration.

2. The system of claim 1, wherein the existing traffic light head is installed in a location for traffic control.

3. The system of claim 1, wherein the light source comprises an LED light circuit board.

4. The system of claim 1, wherein each of the plurality of visors of the traffic light head comprises a cylindrical housing that is hollow and open at a distal end, wherein the housing of each of the plurality of visors has a cutout portion that is open at the distal end of the housing.

5. The system of claim 4, wherein the housing of each of the plurality of light modules comprises a bracket configured to mount the light module onto the frame, wherein the frame and the plurality of light modules are configured such that the bracket of each of the plurality of light modules fits into the cutout portion of the housing of a respective one of the plurality of visors when each of the plurality of light modules are positioned within a respective one of the plurality of visors so that the frame and the each of the plurality of light modules mounted thereon are supported by the existing traffic light head.

6. The system of claim 1, wherein the frame comprises a plurality of vertical frame members and a plurality of rigidly interconnected horizontal frame members.

7. The system of claim 6, wherein the plurality of vertical frame members comprises a plurality of front vertical frame members and a plurality of rear vertical frame members spaced apart from the plurality of front vertical frame members, wherein the plurality of horizontal frame members comprises a plurality of front horizontal frame members and a plurality of rear horizontal frame members spaced apart from the plurality of front horizontal frame members.

8. The system of claim 7, wherein the frame further comprises a plurality of mounting plates each configured to mount a respective one of the plurality of light modules thereon, wherein each of the plurality of mounting plates is attached to a respective one of the plurality of front horizontal frame members and a respective one of the plurality of rear horizontal frame members.

9. The system of claim 1, wherein the cabinet interface device comprises a relay, a resistor, an optocoupler, and a process controller, wherein the resistor is configured to mimic a load of the existing traffic light, wherein the cabinet interface device is configured to receive field terminal outputs from the existing traffic signal controller, wherein the optocoupler is configured to convert a voltage signal to allow the process controller to read the field terminal outputs, wherein the process controller is configured to control the relay based on the voltage signal, and wherein the process controller is further configured to communicate with the wireless communications module to wirelessly control the light signals in the wireless configuration.

10. The system of claim 9, wherein the process controller comprises a microcontroller.

11. A wireless traffic signal system comprising:

an existing traffic light head comprising a visor configured to at least partially shield a light;

an existing traffic signal controller wired to an existing traffic light and configured to control operation of the existing traffic light in a wired configuration;

a light module comprising a housing that supports a light source that is separate from the existing traffic light and is configured for wireless control, wherein the light module is configured to be removably secured to a visor of an existing traffic light head;

a wireless communications module in communication with the light module; and a cabinet interface device configured to communicate wirelessly with the wireless communications module, wherein the cabinet interface device is operably connected to the existing traffic signal controller and is configured to transmit an output status from the existing traffic signal controller to allow the existing traffic signal controller to wirelessly control light signals emitted by the light source of the light module in a wireless configuration.

12. The system of claim 11, wherein the existing traffic light head is installed in a location for traffic control.

13. The system of claim 11, wherein the light source comprises an LED light circuit board.

14. The system of claim 11, wherein the light module comprises an opposing pair of arms that are each resiliently biased inwardly toward an exterior surface of the housing of the light module, wherein the light module and opposing pair of arms are configured to removably secure the light module to the visor of the existing traffic light head with the housing of the light module positioned within an interior of the visor with the arms positioned outside the visor and resiliently biased against an exterior surface of the visor.

15. The system of claim 11, wherein the light module comprises an inflatable pouch disposed on an exterior of the housing of the light module, wherein the light module fits within an interior of the visor when the pouch is deflated, and wherein the light module is removably secured to the visor by outward pressure exerted onto an interior surface of the visor by the pouch when the light module is positioned within the interior of the visor and the pouch is inflated.

16. The system of claim 11, wherein the cabinet interface device comprises a relay, a resistor, an optocoupler, and a process controller, wherein the resistor is configured to mimic a load of the existing traffic light, wherein the cabinet interface device is configured to receive field terminal outputs from the existing traffic signal controller, wherein the optocoupler is configured to convert a voltage signal to allow the process controller to read the field terminal outputs, wherein the process controller is configured to control the relay based on the voltage signal, and wherein the process controller is further configured to communicate with the wireless communications module to wirelessly control the light signals in the wireless configuration.

17. The system of claim 16, wherein the process controller comprises a microcontroller.

* * * * *